July 22, 1952     S. G. WIECHERS     2,604,403
MILK SUBSTITUTES
Filed June 26, 1948
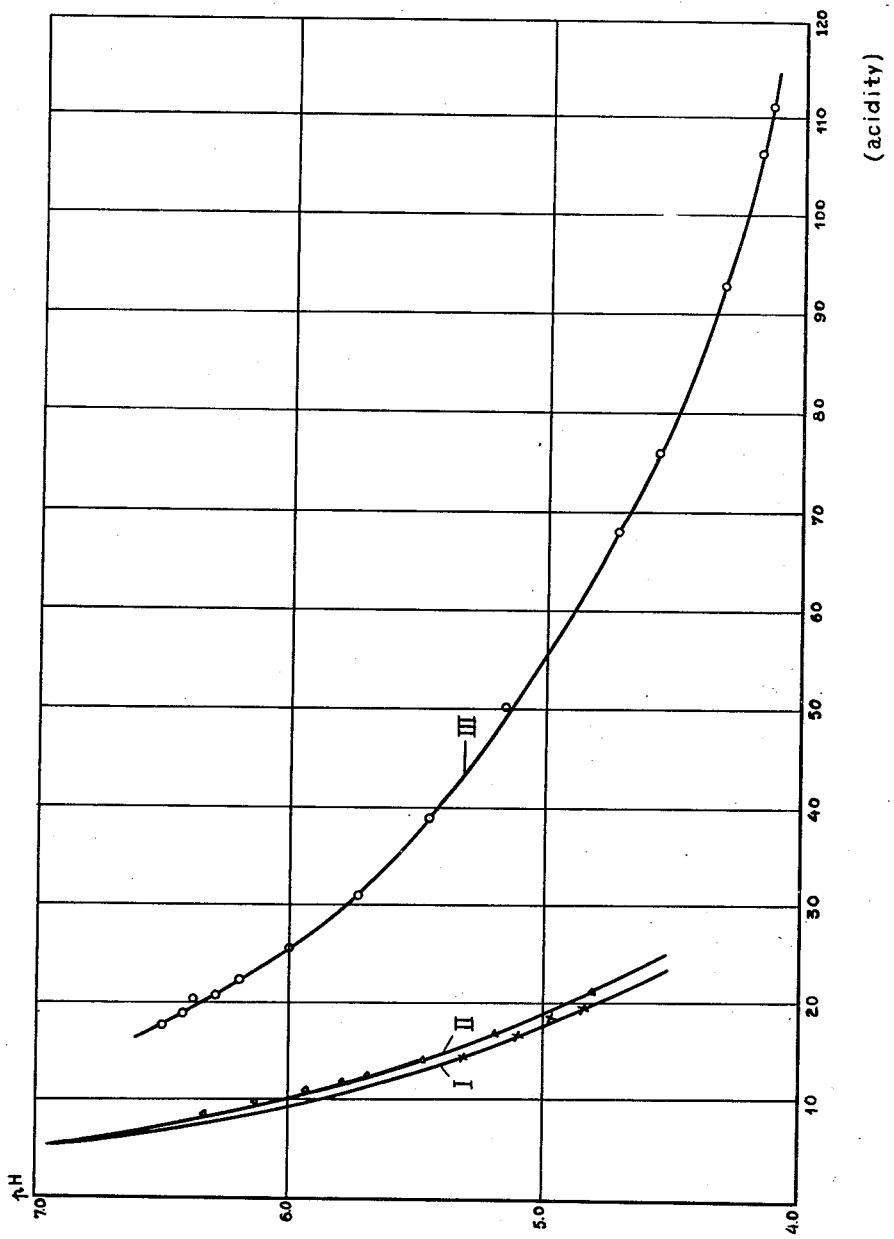
INVENTOR.
SYBRANDUS GERHARDUS WIECHERS
BY *Hammond & Littell*
ATTORNEYS.

Patented July 22, 1952

2,604,403

UNITED STATES PATENT OFFICE 2,604,403

MILK SUBSTITUTES

Sybrandus Gerhardus Wiechers, The Hague, Netherlands, assignor to de Nederlandsche Centrale Organisatie Voor Toegepast-Natuurwetenschappelijk Onderzoek, The Hague, Netherlands, a corporation of the Netherlands Application June 26, 1948, Serial No. 35,344
In the Netherlands April 26, 1948

9 Claims. (Cl. 99—55)

Numerous attempts have already been made to attain a product, which for baby nutrition may replace the mother milk. Although cow milk, diluted or undiluted, buttermilk or preparations produced therewith, respectively, have been used, cases still occur in which disorders in infants due to nutrition may be successfully remedied only by the administration of real mother milk differing considerably from cow milk, as is known, both in chemical analysis and in its physical-chemical behaviour.

According to this invention it is now possible to compound a product, which not only in its chemical analysis, but also in its physical-chemical behaviour is very similar to human milk. A condition essential for obtaining this result is, that whey having an ash content less than 4% and preferably even less than 3%, based upon the dry material, is used as a starting material. An excellent product is obtained with whey having an ash content of about 1%.

By adding other products containing casein and fat and/or oil it is possible to prepare compositions with said whey, which are more or less similar to mother milk. When these products are worked up with the whey, it will be observed, in the first place, that the product thus obtained shows the same acidity/pH-curve as human milk and after curdling gives a very fine coagulum. A big difference between cow milk and human milk is, in fact, that cow milk is very heavily buffered, whereas this is not the case in human milk.

According to the invention products are obtained which show the same pH titration curve as human milk.

In the drawing the dependence of the titrated acidity upon the pH has been given, wherein curve I represents said dependence in human milk, curve II in a product according to the invention and curve III is the pH-acidity curve of cow milk.

There have been previous attempts to use whey in baby nutrition, but a whey having the ash content required according to the present invention was never available. Therefore it has never been possible to eliminate the buffering properties shown by whey as by cow milk; on the contrary, these properties were enhanced, because the salt content of the whey is relatively increased.

Recognition that elimination of this buffering action should be aimed at was also lacking in these attempts. One did desire to reduce the salt content, but this was due to the point of view that the excessive salt content of the well known whey products is noxious and is in itself an obstacle for the preparation of a food product for humans. Thus the attempted reduction of the salt content was never pushed so far that said content attained 4% and less. It should be remarked in this respect, that such a reduction is not simple. Thus a normal dialysis generally causes the removal only of the inorganic constituents, which are not combined i. e. the ionic components. However, the buffering action has not been destroyed thereby. In order to obtain this, combined inorganic constituents, particularly calcium and phosphate should also be removed to a major extent. By a simple dialysis this requires greatly prolonged dialysis times, enhancing a large danger of undesired bacterial growth in the product during treatment and a considerable loss in the content of milk sugar.

However, said removal may be effected in a very satisfactory manner by a thorough electrodialysis, a method as has been described in the copending U. S. patent application No. 11,854 (based on the Dutch patent application 130,674 filed March 3, 1947). A characteristic of that process is that the pH of the electrodialyzing medium is held approximately constant during electrodialysis at unusually high current densities.

A particular advantage thereof is that the albumins and the globulins of the whey are completely preserved, as well as substantially all of its lactose or milk sugar content.

The whey containing less than 4% of ash may be worked up with, for example, full cream milk, milk powder, butter or other fats or oils and thus a suitable baby nutrition product or a dry product convertible into a baby milk or other food product by mixing with water, may be obtained. In order to also approximate the composition of fat of mother milk as nearly as possible, a composition of the fat, in which the proportions of saturated fatty acids, unsaturated fatty acids with one double link and unsaturated fatty acids with more double links are the same as those in mother milk, is preferable (i. e. about 48:40:11.5). These proportions are also quite different in cow milk. (60:36:4.)

So we are able to prepare a synthetic woman's milk with the help of an electrodialyzed whey having an ash-constant in solids lower than 4%, so that the total ash of the synthetic woman's milk is equal to that of genuine woman's milk.

Besides this synthetic woman's milk with equal ash, it is also possible to prepare a synthetic woman's milk, directed to a total ash composition, in which the chlorine content or the soluble cation-content or the Ca/P ratio is equal to that of genuine woman's milk, in which preparation concessions may or may not be made to the equality of the other components in the synthetic woman's milk.

This can be reached by variations in the way of electrodialysis, during which salts are either removed or incorporated, or by adding salts after electrodialysis.

In order to obtain a dry powder, which on mixing with water, directly gives a baby milk, it is advantageous to dry the components jointly after mixing, particularly by atomizing. Other drying methods may be used, such as drying by heated drums, vacuum drying, freeze drying, evaporating.

As to the pasteurization of the milk, if desired this may also be effected by other than thermic methods. Thus the electrodialysis has also a sterilizing effect upon the dialysate. In connection herewith a whey may be used, which is raw and in which, therefore, the enzymes are present in active condition. The electrodialysis results in the death of the bacteria, whereas the enzymes remain intact, which is greatly to the advantage of the substitute mother milk.

The milk may also be subjected to a supersonic operation. Treatment of the milk with supersonic waves at high frequency energy results not only in a fine distribution of the fat in the milk, but also in a nearly complete destruction of the bacteria flora in the milk. An electronic treatment likewise gives a sterilizing effect without destruction of the enzymes.

In addition to ordinary vitaminization, in which vitamins are added dissolved either in water or in fat, exposure of the milk or cream to ultra violet rays is also used, which treatment exerts a sterilizing effect and at the same time serves to vitaminize the product (formation of vitamins $D_2$ from ergosterin or of $D_3$ from the provitamin 7-dehydrocholesterol).

Emulsifying agents are advantageously added in the process according to the invention, in order to emulsify the fat and/or the oil. Phospholipoids, such as lecithin, are eminently suitable therefor, because these substances not only exert an emulsifying influence, but are also important for the transportation of the fats in the organism. As such they assist in the building up of the cells.

Other additions may be advantageous. Thus it is sometimes necessary to add antioxidants, such as ascorbic acid.

A small dosage of iron, zinc and copper is necessary in order to cause the composition of the product to approximate more nearly that of human milk.

In addition to neutral substitute baby milk having a pH of 7 an acid substitute baby milk having a pH of about 4.5 may also be prepared. Citric or lactic acid may advantageously be used therefor. In some cases this may have particular advantages, amongst others that the casein is present in the milk in a preformed very finely divided condition and also that the primarily acid reaction of the milk prevents development of coli bacteria in the stomach.

Although the nutritions mentioned till now are especial substitute infant-nutritions, it is possible however to prepare infant-feeding foods wherein the age or special needs are taken into consideration. It must e. g. be taken into account that after 6 months the iron-deposit in the liver of the infants is exhausted. Then a higher iron content in the nutrition is needed, about 15 mg. of Fe or more a day, according to the need for iron.

Also for older children or reconvalescents, neutral or acid nutritions can be prepared with or without saccharose or dextromaltose and/or fructose.

It will be clear that various embodiments of the present invention are possible, which are illustrated hereinafter by some examples.

Example I 28 litres of cow milk having a fat content of 3.35% were mixed with 7 litres of cream having a fat content of 40% and heated to 60° C. This mixture was then passed through a homogenizer at a pressure of about 250 atmospheres, followed by a second homogenization at about 50 atm., i. e. at considerably lower pressure than the first time.

It was then pasteurized at 75 to 80° C. and cooled to about 50° C. at which temperature an electrodialized whey concentrate containing 6.1 kg. of dry whey substance in about 40% solution was added, the electrodialysis of which had been effected according to the copending U. S. patent application No. 11,854 in such a way, that the ash content of the dry substance was 1.5%. After the milk sugar had been sufficiently dissolved, the mixture was further cooled down to about 10° C. If desired in view of conservation of the liquid it may also be cooled down to 4 to 5° C.

Simultaneously with the whey concentrate 4 to 5 gr. of vitamin C were added serving both as an antioxidant and as a vitaminization of the final product.

The product thus obtained was atomized in known manner, in which care was taken that the temperatures used did not lead to denaturation of the proteins, i. e. at temperatures in the range of 60-75° C. The atomized product after having been bolted was packed in tins in an atmosphere of nitrogen.

Example II 6.1 kg. of dialyzed whey powder produced according to the aforesaid patent application containing 4% of moisture and 2.5% of ash, was dissolved in 35.3 kg. of cream containing 10.33 % of fat at 50° C. and the mixture obtained was cooled down to 10° C. The resulting solution was atomized in such a way that the temperatures used did not lead to denaturation of the product, i. e. at a temperature in the range of 60-75° C. The atomized product, after having been bolted, was packed in tins in an atmosphere of nitrogen.

Example III 6 kg. of cream powder having a fat content of 60%, to which were added 0.14 gr. of vitamin A and 5 gr. of vitamin C, were mixed with 6.4 kg. of dialyzed whey powder obtained according to the copending U. S. patent application No. 11,854 and containing 4% of moisture and 2.5% of ash. Both products should be thoroughly dried by means of an atomizing apparatus and they were atomized separately at such temperatures that the proteins were not denatured, which temperatures moreover depended upon the construction of the apparatus. The intimately mixed product after having been bolted was packed in tins in a nitrogen atmosphere.

Example IV 28 litres of cow milk containing 3.35% of fat was heated, at 60° C., with 7 litres of cream containing 40% of fat, in which 0.16 gr. of vitamin A had been dissolved. This mixture was then passed through a homogenizer at a pressure of about 250 atm., followed by a second homogenization at about 50 atm., i. e. at a considerably lower pressure than the first time. The mixture was then exposed to ultra violet rays. This was done in a suitable apparatus in such a way that the milk was passed in a thin layer through an apparatus having a sufficient radiation intensity. Next there was added, at a temperature of 50° C. the dialyzed whey concentrate, the electrodialysis of which had been brought about according to the copending U. S. patent application No. 11,854 in such a way that the ash content in the dry substance was 1.5%, containing 6.1 kg. of dry whey substance in about 40% solution and having dissolved therein 5 gr. of vitamin C.

The product thus obtained was cooled and atomized and further worked up according to the process indicated in Example I.

Example V

Whey, liberated in the preparation of cheese, in which the cheese milk was not pasteurized, was evaporated to a content of about 50% of dry substance. This liquid was subjected to an electrodialysis according to the U. S. patent application No. 11,854 in such a way, that the ash content was 4.5% in the dry substance, containing 6.1 kg. of whey dry substance in about 40% solution. After addition of about 4-5 gr. of vitamin C said solution was atomized to a dialyzed raw whey powder. 35.3 kg. of raw cream containing 10.3% of fat, in which 0.14 gr. of vitamin A had been dissolved, was pasteurized in nonthermic manner, by electrodialysis according to the prescription of the copending U. S. patent application No. 11,854 to an ash content, allowed to be higher in this case for a sterilisation, of 4% in the dry substance and/or sterilized by exposure to ultra violet rays. The cream was then atomized separately at such temperatures, that the proteins were not denaturated, i. e. at temperatures in the range of 60–75° C. The cream powder obtained was then mixed thoroughly with the dialyzed raw whey powder and after having been bolted was packed in tins in an atmosphere of nitrogen.

Example VI 35.3 kg. of raw cream having a fat content of 10.3% was subjected to an electrodialysis according to the copending U. S. patent application No. 11,854 in such a way, that 60% of the ash present was removed. Hereto was added 5 gr. of vitamin C, 0.14 gr. of vitamin A, 5 gr. of MaCl, 0.50 gr. of ferrous sulfate, 0.1 gr. of cupric chloride, 0.6 gr. of zinc chloride, 10 gr. of citric acid, 0.001 gr. of potassium iodide and 8.9 kg. of a dialyzed whey paste (67% of dry substance) containing 4% of ash in the dry substance, prepared from raw whey without any thermic pasteurization. The total mixture was raised to a temperature of 50° C. and rapidly dissolved. After dissolving the liquid was quickly cooled down to 5° C. and as quickly as possible atomized in known manner. The liquid was continuously stirred for atomizing.

Example VII 25 litres of cow milk, in which one half of 56 gr. of lecithin was dissolved, was mixed with 3 litres of palm oil, in which about 0.1–0.15 gr. of vitamin A had been dissolved and to which the rest of the lecithin had been added. This mixture was heated to 60° C., after which it was led through a homogenizer at a pressure of about 250 atm., followed by a second homogenization at about 50 atm., i. e. considerably lower than the first time. The mixture was then pasteurized at 75–80° C. and cooled to about 50° C., at which temperature an electrodialyzed whey concentrate was added, the electrodialysis of which had been effected according to the copending U. S. patent application No. 11,854 in such a way that the ash content was 2.5% in the dry substance, this concentrate containing 6.4 kg. of whey dry substance in about 40% solution. After the milk sugar had been sufficiently dissolved, the material was further cooled to about 10° C. or, if desired in view of conservation of the liquid, to 4–5° C. Simultaneously with the whey concentrate 4–5 gr. of vitamin C was added, which vitamin was used as an antioxidant and as a vitaminization of the final product. Moreover there was added 5 gr. of sodium ion, 0.28 mg. of ferrous ion, 0.03 gr. of cupric ion, and 0.4 gr. of zinc ion in the form of sulfates, chlorides or lactates; furthermore 25 gr. of citric acid, 4/5 of which was in the form of sodium citrate and 1/5 in the form of citric acid as such, were added in order to obtain a product, the pH of which was about 7. The product thus obtained was atomized in known manner, in which care was taken, that the temperatures used did not lead to denaturation of the proteins, i. e. at temperatures in the range of 60–75° C. The atomized product after having been bolted was packed in tins in an atmosphere of nitrogen.

Example VIII

In the process according to Example VII a mixture consisting of 0.5 litre of cocoanut oil and 2.5 litres of palm oil was substituted for the 3 litres of palm oil.

Example IX

In the process according to Example VII 2.7 litres of palm oil and 0.2 litres of linseed oil were substituted for 3 litres of palm oil.

Example X

In the process according to Example VII a mixture of 2.3 litres of palm oil and 0.6 litres of linseed oil was substituted for the 3 litres of palm oil; in view of the retention of fat it is advantageous to increase the quantity of linseed oil.

Example XI

If skimmed milk was substituted for full cream milk, in the process according to Example VII 23.2 litres of skimmed milk were mixed with 3.70 litres of oil, either palm oil as such, or palm oil mixed with cocoanut oil and/or linseed oil in the proportions indicated in Examples VIII, IX and X.

Example XII

An acid baby food was obtained by adding in the process according to Example VII, just before atomizing, the calculated amount of citric acid such that the content of citric acid was 1.3% in the dry substance and an acid baby milk having a pH=4.5 was obtained.

Example XIII

A lactic acid baby food was prepared instead of a citric acid baby food by adding in the process according to Example VII, just before atomizing, the calculated amount of lactic acid such that the content of lactic acid was 2% in the dry substance and there was finally obtained an acid baby food having a pH=4.5.

Example XIV

*Children's nutrition for older babies above the age of 6 months.*—28 litres cow's milk of 3.35% fat to which 28 gm. lecithin was added was mixed with 7 litres cream of 40% fat to which was added 28 gm. lecithin, 0.16 gm. vitamin A and 4 mg. vitamin D, and was heated to 60° C. Then this mixture was led through an homogenizer at a pressure of 250 atmospheres, after which a second homogenization followed at about 50 atmosphere, at least considerably lower than the first time. Then it was pasteurized at about 75–80° C. and cooled to about 50° C., at which temperature the mixture was irradiated by ultraviolet light. This was done in a suitable apparatus in such a way that the milk was led in a thin layer through an apparatus of sufficient irradiation-intensity. Then at a temperature of 50° C. the dialyzed whey-concentrate was added, of which the electrodialysis was carried out according to the copending U. S. patent Application No. 11,854 in such a way that the ash content in solids was 4%, and which contains 6.4 kg. whey solids in a solution of about 40%. Together with the whey-concentrate were added 10 gm. vitamin C, which vitamin was used both as an antioxidant and for vitaminizing the final product, 1.5 gm. ferrosulphate, 0.1 gm. cuprisulphate, 1 mg. calciumiodide and a calculated quantity of lactic acid, so that the lactic acid content in solids was 2% and an acid nutrition was obtained with a pH of 4.5.

The product thus obtained was spray dried in the well-known way, during which care was taken that the temperatures used did not give rise to protein denaturation, i. e. at temperatures between 60° and 75° C. The sprayed product was canned in N-atmosphere after bolting. A single nutrition is obtained by diluting the sprayed powder in tepid water (40° C.) in a ratio of 13.5 gm. powder per 100 gm. water.

Example XV

*The preparation of a synthetic human milk of which the chlorideion content is equal to that of genuine human milk, but of which the total ash content in the reconstructed human milk is about 4%, this means a 12% dilution.*—In this case we start from genuine human milk according to the analyses by Randoin.

7 kgm. cream powder with a fat content of 50% to which 0.16 gm. vitamin A and about 6 gm. vitamin C were added was mixed with 6.2 kg. dialyzed whey-powder, obtained according to the copending U. S. patent application with a moisture content of 4% and an ash content in solids of 4%.

Both products must be dried well by means of a spray-apparatus. They were sprayed separately at such temperatures that the protein was not denaturated, and which temperatures were dependent on the construction of the apparatus. The intensively mixed powder was canned in a N-atmosphere after bolting.

Example XVI

*Preparation of a synthetic human milk of which the total ash content is identical to the content of real human milk (0.3 per cent) which is the case when the sprayed powder obtained is dissolved in water to 12 per cent.*—In this case we start from the real human milk according to the analyses of Randoin.

32.41 litres whole cow's milk with a fat content in solids of 32.25 per cent in which 32 gm. lecithin was dissolved was mixed with 5.07 litres cream with 50 per cent fat in which 32 gm. lecithin and 0.16 gm. vitamin A were dissolved and heated to 60° C. Then this mixture was led through a homogenizer at a pressure of 250 atmosphere after which followed a second homogenization at about 50 atmosphere at least at a considerably lower pressure than the first time. Then it was pasteurized at about 75° to 80° C. and cooled to about 50° C. at which temperature an electrodialyzed whey concentrate was added of which the electrodialysis had been carried out according to the copending U. S. patent application No. 11,854 in such a way that the ash content in solids was 0.82 per cent, and which contained 5.88 kg. whey solids in about 40 per cent solution. When the lactose was sufficiently dissolved the material was cooled further to about 10° C. or to 4–5° C. if desired with view to preserving the liquid. Together with the whey concentrate 4–5 gm. vitamin C was added.

The product now obtained was spray dried in the well-known way during which care was taken that the temperatures used did not give rise to protein denaturation i. e. at temperatures between 60 and 75° C. The spray dried product was canned in a N-atmosphere after bolting.

Example XVII

*Method for preparing an albumen-milk.*—From 22.5 kg. dialyzed whey paste with a moisture content of 60 per cent and an ash content in solids of 2.5 per cent the lactose was removed by crystallization to a content in solids of 59 per cent by which the albumen content became about 33 per cent. Then 10 gm. vitamin C was added. The product obtained was heated to 60° C. together with 3.5 kgm. unsalted butter after which were added to the molten mass 56 gm. lecithin and 0.14 gm. vitamin A. Then this mixture was led through a homogenizer at a pressure of 250 atmospheres after which followed a second homogenization at about 50 atmospheres, at least at a considerably lower pressure than the first time, and cooled to about 10° C. The product now obtained was spray dried in the well-known way, during which care was taken that the temperatures used did not give rise to proteins (albumen) denaturation i. e. at temperatures between 60 and 75° C. The sprayed product was canned in a N-atmosphere after bolting.

I claim:

1. A food composition especially suitable for human infant nutrition comprising essentially, in intimate association, an electrodialyzed whey containing in its solids content less than 4% of ash, substantially all the albumin and globulin and lactose contained in the raw whey, and only a minor proportion of the calcium and phosphorus contained in the raw whey, together with added edible fat and added casein.

2. A food composition especially suitable for human infant nutrition comprising essentially, in intimate association, an electrodialyzed whey containing in its solids content less than 4% of ash, substantially all the albumin and globulin and lactose contained in the raw whey, and only a minor proportion of the calcium and phosphorus contained in the raw whey, together with added edible fat and added casein, the ratio of albumin to casein in the composition being approximately the same as in human milk.

3. A food composition especially suitable for human infant nutrition comprising essentially, in intimate association, an electrodialyzed whey containing in its solids content less than 4% of ash, substantially all the albumin and globulin and lactose contained in the raw whey, and only a minor proportion of the calcium and phosphorus contained in the raw whey, together with added food substances of types occurring in milk, the composition having an acidity/pH curve approximately the same as that of human milk.

4. A food composition especially suitable for human infant nutrition comprising essentially, in intimate association, an electrodialyzed whey containing in its solids content less than 4% of ash, substantially all the albumin and globulin and lactose contained in the raw whey, and only a minor proportion of the calcium and phosphorus contained in the raw whey, together with added edible fat and added casein, the ratio of albumin to casein in the composition being approximately the same as in human milk, and the composition having an acidity/pH curve approximately the same as that of human milk.

5. A food composition especially suitable for human infant nutrition comprising essentially, in intimate association, an electrodialyzed whey containing in its solids content not more than about 1% of ash, substantially all the albumin and globulin and lactose contained in the raw whey, and only a minor proportion of the calcium and phosphorus contained in the raw whey, together with added edible fat and added casein, the ratio of albumin to casein in the composition being approximately the same as in human milk, and the composition having an acidity/pH curve approximately the same as that of human milk.

6. A food composition especially suitable for human infant nutrition comprising essentially, in intimate association, an electrodialyzed whey containing in its solids content less than 4% of ash, substantially all the albumin and globulin and lactose contained in the raw whey, and only a minor proportion of the calcium and phosphorus contained in the raw whey, together with added edible fat and added casein, at least a substantial part of said fat being added in the form of an edible vegetable oil containing esters of both saturated and unsaturated fatty acids.

7. A food composition especially suitable for human infant nutrition comprising essentially, in intimate association, an electrodialyzed whey containing in its solids content less than 4% of ash, substantially all the albumin and globulin and lactose contained in the raw whey, and only a minor proportion of the calcium and phosphorus contained in the raw whey, together with added edible fat and added casein, at least a substantial part of said fat being added in the form of an electrodialyzed cream.

8. A food composition especially suitable for human infant nutrition comprising essentially, in intimate association, an electrodialyzed whey containing in its solids content less than 4% of ash, substantially all the albumin and globulin and lactose contained in the raw whey, and only a minor proportion of the calcium and phosphorus contained in the raw whey, together with added edible fat and added casein, at least a substantial part of said fat and said casein being added in the form of a dispersion of vegetable oil fatty acid esters in cow milk.

9. A food composition especially suitable for human infant nutrition comprising essentially, in intimate association, an electrodialyzed whey containing in its solids content less than 4% of ash, substantially all the albumin and globulin and lactose contained in the raw whey, and only a minor proportion of the calcium and phosphorus contained in the raw whey, together with added edible fat and added casein, the ratio of albumin to casein in the composition and the proportions of calcium and phosphorus therein being approximately the same as in human milk.

SYBRANDUS GERHARDUS WIECHERS.

REFERENCES CITED

The following references are of record in the file of this patent:

UNITED STATES PATENTS

| Number | Name | Date |
| --- | --- | --- |
| 1,022,523 | Whitney | Apr. 9, 1912 |
| 1,503,892 | Grindrod | Aug. 5, 1924 |
| 1,511,808 | Grindrod | Oct. 14, 1924 |
| 1,714,597 | Grindrod | May 28, 1929 |
| 2,437,080 | Daniel | Mar. 2, 1948 |